(12) United States Patent
Teng et al.

(10) Patent No.: US 7,128,563 B2
(45) Date of Patent: Oct. 31, 2006

(54) CLAMPING DEVICE FOR INJECTION-MOLDING MACHINE

(75) Inventors: Ming-Chang Teng, Hsinchu (TW); Hsiang-Nien Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 368 days.

(21) Appl. No.: 10/682,526

(22) Filed: Oct. 10, 2003

(65) Prior Publication Data

US 2005/0042326 A1  Feb. 24, 2005

(30) Foreign Application Priority Data

Aug. 18, 2003  (TW) ............................. 92122585 A

(51) Int. Cl.
*B29C 45/64* (2006.01)

(52) U.S. Cl. .................. 425/556; 425/444; 425/451.7; 425/590; 425/595

(58) Field of Classification Search ................ 425/556, 425/590, 595, 451.2, 451.7, 444
See application file for complete search history.

(56) References Cited

U.S. PATENT DOCUMENTS

| | | | | |
|---|---|---|---|---|
| 3,604,058 A | * | 9/1971 | Fischbach | ................. 425/150 |
| 3,611,502 A | * | 10/1971 | Florjancic | ................. 425/451.7 |
| 3,704,973 A | * | 12/1972 | Renfrew et al. | ......... 425/451.7 |
| 4,929,165 A | * | 5/1990 | Inaba et al. | ............... 425/451.7 |
| 5,266,874 A | | 11/1993 | Stillhard | |
| 5,698,240 A | * | 12/1997 | Haguchi | ................. 425/451.2 |
| 5,879,726 A | * | 3/1999 | Hsing | ................. 425/451.7 |
| 6,186,770 B1 | * | 2/2001 | Ziv-Av | ................. 425/451.7 |
| 6,254,371 B1 | | 7/2001 | McNally | |
| 6,254,378 B1 | * | 7/2001 | Berghoff | ................. 425/451.7 |
| 6,893,246 B1 | * | 5/2005 | Teng et al. | ............... 425/451.7 |

FOREIGN PATENT DOCUMENTS

| | | |
|---|---|---|
| DE | 1091744 | 10/1960 |
| EP | 0723848 | 7/1996 |
| JP | 60-139419 | 7/1985 |
| JP | 61-19326 | 1/1986 |
| JP | 2-227230 | 9/1990 |
| TW | 00537171 | 6/2003 |
| WO | WO 02/11969 | 2/2002 |

* cited by examiner

*Primary Examiner*—James P. Mackey
(74) *Attorney, Agent, or Firm*—Rabin & Berdo, P.C.

(57) ABSTRACT

A clamping device for injection molding machine is proposed. The clamping device has a movable mold holder, a guiding unit, a screw rod unit, a transmission unit, a first clamping unit, and a second clamping unit. Power from the driving source is transmitted via the transmission unit to the screw rod unit, so as to drive the movable mold holder to move in reciprocating motion. When the mold is actuated to close, the first clamping unit engages to a gear wheel member of the screw rod unit. The gear wheel member and the first clamping unit are driven by the second clamping unit to move for generating a rotational torque, and to drive the screw rod unit for generating a clamping thrust.

20 Claims, 4 Drawing Sheets

CLAMPING DEVICE FOR INJECTION-MOLDING MACHINE

BACKGROUND OF THE INVENTION

1. Field of the Invention

The invention relates to a clamping device, and more particularly, to a clamping device applicable to an injection-molding machine and is combined with different driving sources to improve its torque and to drive a screw rod for generating a high clamping force.

2. Description of the Related Art

The clamping device is one of many critical parts in an injection-molding machine to ensure reliable closing of a mold. Since molten material is supplied into a mold cavity under an extreme high pressure, it is necessary to apply a sufficient clamping force to tightly close the mold to avoid flashing, molded product with flashes, or other conditions that would adversely affect the quality of the molded products.

Typically, a hydraulic injection-molding machine has two types of clamping devices, a toggle type and a direct pressure type. A fully electronic injection-molding machine is one product that has recently been actively researched and developed by injection mold manufacturers all over the world. For the fully electronic injection-molding machine, the pressure cylinder of the toggle type clamping device is substituted with a motor unit to achieve the same opening/closing of the mold as the hydraulic injection molding machine, and to acquire a higher clamping force more easily than the direct pressure type clamping device.

A screw rod in the clamping device serves to covert a rotational movement into a linear movement and vice versa. Based on the mechanical equation, it is understood that a greater input torque for the rotational movement causes a greater linear thrust to be generated by the screw rod. For the direct pressure type clamping device equipped with a motor unit and the screw rod, the power output from the motor device is smaller than the pressure cylinder. So, it is necessary to increase torsion and decrease the lead of the screw rod in order to achieve the same clamping force. Similar implementing methods have been disclosed in U.S. Pat. No. 5,266,874 and U.S. Pat. No. 6,254,371 as well as in WO02/11969.

However, a typical injection-molding machine requires a high-speed actuation during clamping, while the product injection requires a high pressure clamping force. So, to achieve the objective of high speed and high pressure using a single driving source would mean use of a large and inappropriate driving source, thereby causing energy wastage. Meanwhile, an increased torsion and a decreased lead of the screw rod results in a lower speed in terms of opening/closing of the mold, leading to an increase in molding cycle time. As a result, the power of the motor unit would have to be maximized when the clamping device of the conventional injection-molding machine is applied to achieve opening/closing the mold at a high speed with a high clamping force, further wasting cost and energy.

To improve the drawbacks associated with the clamping device of the injection-molding machine as described above, relative resolutions were proposed from an issued Taiwan Patent with a Patent No. TW00537171. The patent discloses generating power using a single low power driving source. By changing the lead of the clamping device, a large lead screw rod ensures opening/closing the mold at a high speed, and a small lead screw rod generates a high pressure clamping thrust. Since the clamping force is inversely proportional to the lead size, a larger clamping force output requires a smaller lead for the screw rod.

However, there are certain limitations in terms of processing the lead of the screw rod. Even though a high pressure clamping is achieved through the patent disclosed as above, there are still limitations posed by the lead of the screw rod when a single driving source is adopted. As a result, the clamping force can only be obtained under certain criteria. So, there are still areas that require further improvements in the prior art.

Therefore, the above-mentioned problems associated with the prior arts are resolved by providing a clamping device that progresses quickly to close the mold, and provides a sufficient clamping force for clamping the mold substantially when the contact is made to the mold, so as to improve the clamping force for the injection molding machine while saving on fabrication costs and energy.

SUMMARY OF THE INVENTION

The primary objective of the present invention is to provide a clamping device for the injection-molding machine capable of combining with different driving sources.

Another objective of the present invention is to provide a clamping device for the injection-molding machine, so as to increase its torque and to drive a screw rod for generating a high-pressure clamping force.

A further objective of the present invention is to provide a clamping device for the injection-molding machine so as to minimize a fabrication cost.

In accordance with the above and other objectives, the present invention proposes a clamping device for the injection-molding machine. The clamping device has a movable mold holder, a guiding unit, a screw rod unit, a transmission unit, a first clamping unit, and a second clamping unit. The movable mold holder has one side that is coupled to a mold. The guiding unit is fixed on a platform of the injection-molding machine so as to guide the movable mold holder mounted thereon to move in linear motion. The screw rod unit has one end that is connected on the other side of the movable mold holder and penetrates through a first engaging part of a gear wheel member, such that the screw rod unit is driven by rotation of the gear wheel member to move in linear motion. The gear wheel member also has a second engaging part. The transmission unit transmits power of a driving source to the screw rod unit.

The first clamping unit is connected to one side of the screw rod unit away from the movable mold holder, and is coupled with an engaging member having a third engaging part. So, the engaging member is driven by the first clamping unit to cause the third engaging part engaging to/disengaging from the second engaging part outside the gear wheel member. The second clamping unit is fixed on the first clamping unit to push the third engaging part of the first clamping unit, such that the third engaging part engages to the second engaging part to generate a rotational torque. The gear wheel member is driven by the rotational torque to engage the screw rod unit in a high pressure clamping movement for closing the mold. As the mold is opened, the third engaging part is disengaged from the second engaging part and the driving source is reversed to actuate the screw rod unit, so that the screw rod unit drives movement of the movable mold holder and the mold to complete opening of the mold.

The rotational torque generated as a result of the third engaging part engaging to the second engaging part is transmitted via the gear wheel member to the screw rod unit such that the screw rod unit is subjected to a large thrust for clamping. Thus, at the initial stage for closing the mold, the screw rod quickly reaches a mold closing state. As the mold closing state is reached the first and second clamping units are actuated to amplify the driving torsion given to the screw rod, so as to generate a high pressure linear thrust. Hence, the first clamping unit and the second clamping unit serve as driving sources to strengthen the clamping force, and to further generate clamping force without upper limit for clamping.

According to the clamping device of the invention, a combination can be made with different driving sources, such as the driving source for driving the guiding unit, the first clamping unit for engaging to the gear wheel member, and the second clamping unit for rotating the screw rod unit and the gear wheel member. As a result, the torque for the clamping device is enhanced and the screw rod unit is driven to generate the high pressure clamping force. Therefore, the mold can be closed at a high speed with a high pressure clamping force generation. This improves from the drawbacks associated with the prior art, and improves the clamping force while the processing cost and energy are saved.

To provide a further understanding of the invention, the following detailed description illustrates embodiments and examples of the invention, it is to be understood that this detailed description is being provided only for illustration of the invention and not as limiting the scope of this invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
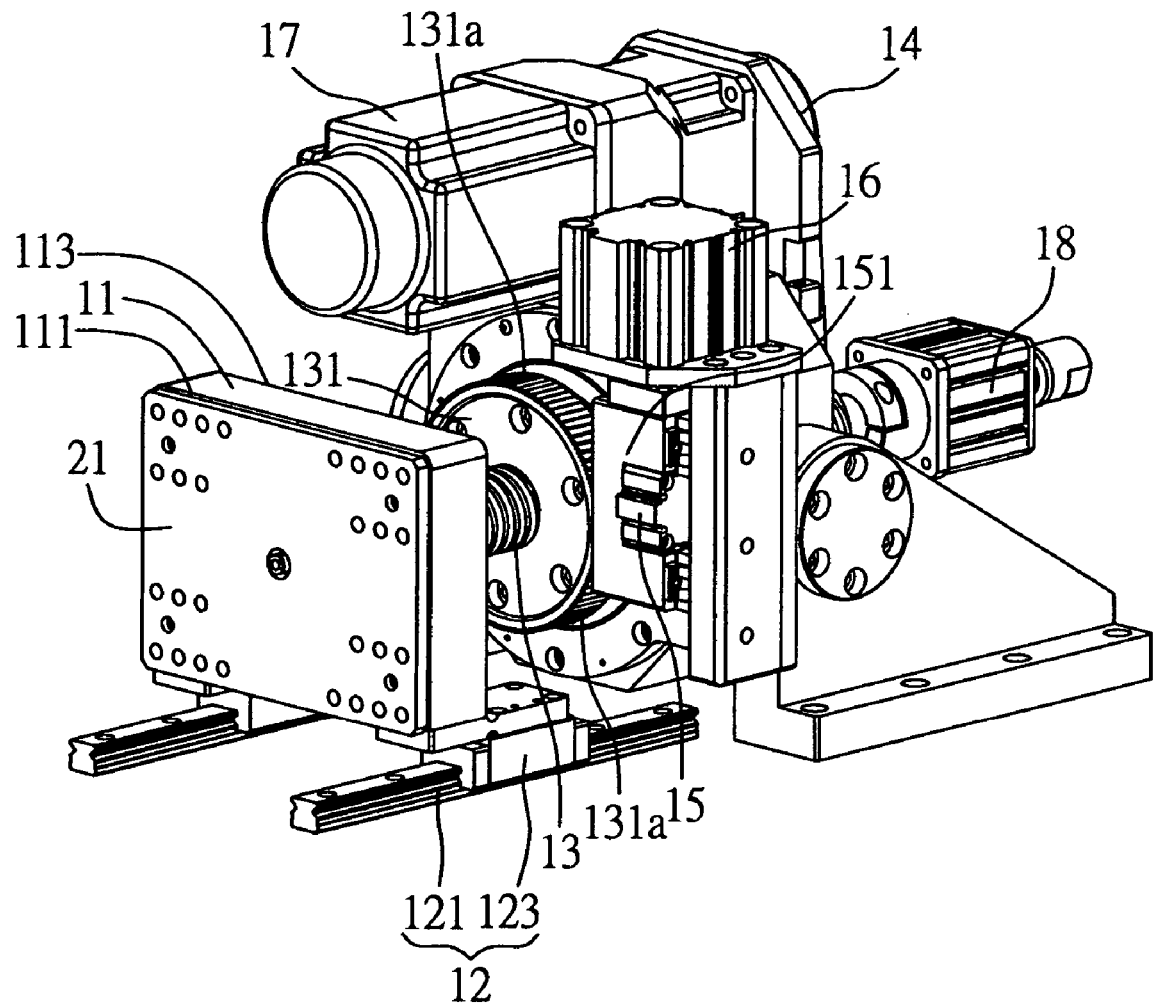
FIG. 1 is a structural diagram illustrating a clamping device for the injection-molding machine according to one preferred embodiment of the present invention.

The preferred embodiment of the clamping device of the injection-molding machine is described in the following with reference to FIG. 1 through FIG. 6. As shown in the diagrams, the clamping device for the injection molding machine includes a movable mold holder 11, a guiding unit 12, a screw rod unit 13, a transmission unit 14, a first clamping unit 15, and a second clamping unit 16. And to simplify the diagrams for a clearer illustration, only units related to the clamping device in the injection-molding machine are illustrated and labeled with numbers, so the detailed structure is omitted in the diagrams.

Figure 2:
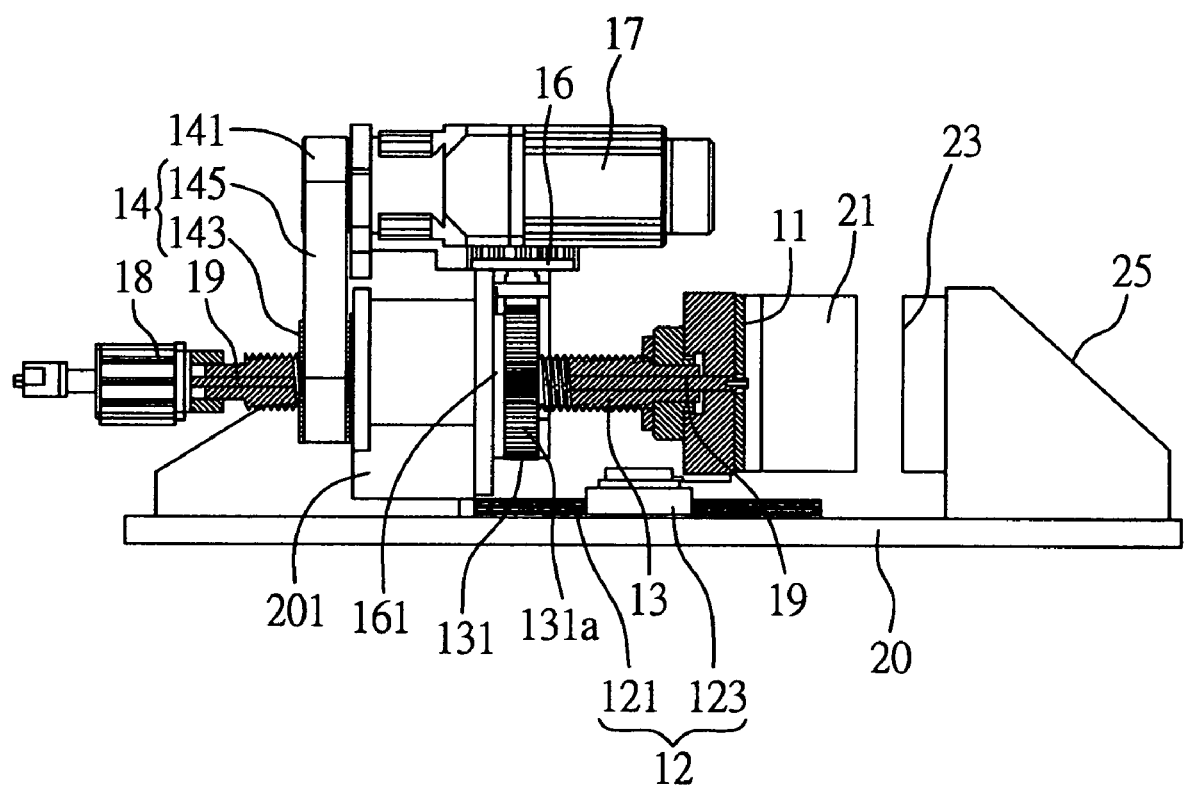
FIG. 2 illustrates a side view of the clamping device for the injection-molding machine according to one preferred embodiment of the present invention.

Referring to both FIG. 1 and FIG. 2, the movable mold holder 11 has a first side 111 and a second side 113, with the first side coupled to a first mold 21 and the second side 113 coupled to the screw rod unit 13. The guiding unit 12 includes a sliding track 121 and a sliding seat 123 mounted on a platform 20 of the injection-molding machine, so as to guide the movable mold holder 11 fixed on the sliding seat 123 to move in a linear motion. The guiding unit 12 may also include, but not limited to other equivalent structures, such as screw rods, for similarly guiding the movable mold holder 11 to move in the linear motion.

The screw rod unit 13 may optionally be a large lead screw rod that converts the rotational movement into a high-speed linear movement, or a hollow tube unit with a projecting unit 19 accommodated therein. The screw rod unit 13 has one end that drives the movable mold holder 11 to move in the linear motion. The projecting unit 19 may be a rod piece that is co-axially formed with the screw rod unit 13 at the center thereof. The projecting unit 19 penetrates the movable mold holder 11 to connect to the first mold 21, so as to push out the molding product when the first mold 21 and the second mold 23 are opened.

The screw rod unit 13 has one end fixed to the second side 113 of the movable mold holder 11 via a fastening unit (not shown) A gear wheel member 131 is mounted surrounding an outside of the screw rod unit 13. The gear wheel member 131 has a first engaging part (not shown) that serves as internal threads and a second engaging part 131a that serves as external gear teeth. As shown in the diagram, the screw rod unit 13 penetrates the first engaging part of the gear wheel member 131, such that the screw rod unit 13 is driven by rotation of the gear wheel member 131 to move in the linear motion. The first engaging part may be any structure that engages correspondingly to the threads of the screw rod unit 13 as long as the screw rod unit 13 matches with the internal threads of the gear wheel member 131, and the gear wheel unit 131 shares the same rotational axis with the screw rod unit 13. The gear wheel member 131 may optionally be a gear wheel, friction wheel, pulley, or other equivalent structures having transmission structures.

The transmission unit 14 transmits power of a driving source 17 to the screw rod unit 13, where the driving source 17 may include a servomotor. The driving source 17 is coupled to a top center portion of a bearing seat 201 of the platform 20, so that a driving power output from the driving source 17 is transmitted via the transmission unit 14 to actuate rotation of the gear wheel member 131. Accordingly, the screw rod unit 13 is driven to move in a reciprocating motion.

As illustrated in FIG. 2, the transmission unit 14 further includes an active wheel 141, a passive wheel 143, and a transmission member 145. The active wheel 141 is driven to rotate by the power input from the driving source 17. The active wheel 141 then transmits the power via the transmission member 145 to actuate rotation of the passive wheel 143. So, the power may be transmitted to the screw rod unit 13, which is driven to move in reciprocating motion. The transmission member 145 may be a time driven belt, chain, gear wheel, or other equivalent members capable of transmitting the power to actuate rotation of the passive wheel 143. Since the principles and effects related to driving the reciprocating movement of the screw rod unit 13 using the active wheel 141, the passive wheel 143, and the transmission member 145 are well known to those ordinary skilled in the art, the details are omitted herein.

In the present embodiment, the first clamping unit 15 is connected on one side of the screw rod unit 13 and away from the movable mold holder 11, and is coupled with an engaging member 151. The engaging member 151 is formed with a third engaging part 151a. As shown in both FIG. 3 and FIG. 4, the first clamping unit 15 may be driven by a pressure cylinder or other equivalent units capable of moving in a reciprocating motion. The third engaging part 151a may optionally be a rack that corresponds to the second engaging part 131a, such that the third engaging part 151a of the engaging member 151 engages to or disengages from the second engaging part 131a outside the gear wheel member 131 when the engaging member 151 is driven by the first clamping unit 15.

As shown in the diagram, the engaging member 151 is fixed in between the first clamping unit 15 and the screw rod unit 13 to engage to the second engaging part 131a of the gear wheel member 131 in such a way that the third engaging part 151a engages to the second engaging part 131a of the gear wheel member 131. And as the engaging member 151 is driven, it actuates the gear wheel unit 131 having the second engaging part 131a to move in a reciprocating motion.

The present embodiment is described with the third engaging part 151a having a rack structure and the second engaging part 131a having a gear wheel structure as the examples. However, it should be understood that the structures of the third engaging part 151a and the second engaging part 131a shall not be limited as such. A friction board, flat drive belt, and other equivalent structures having the power transmission function are equally applicable to the present invention. The first clamping unit 15 and the engaging member 151 may optionally be freely coupled to a sliding member 161. And the second clamping unit 16 is coupled on the first clamping unit 15 to drive the first clamping unit 15 and the engaging member 151 so as to rotate the gear wheel member 131 in a reciprocating motion. The sliding member 161 includes, but is not limited to, a sliding track. The sliding member 161 may also be a linear bearing, a linear moving unit, or other equivalent units that allow free sliding of the first clamping unit 15 and the third engaging unit 151a when driven by the second clamping unit 16.

Figure 4:
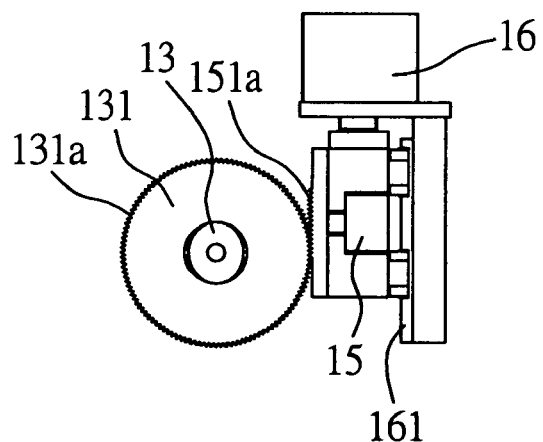
FIG. 4 is an elevation view illustrating the clamping device for the injection-molding machine when a mold closing step is changed to a clamping step according to one preferred embodiment of the present invention.
Figure 5:
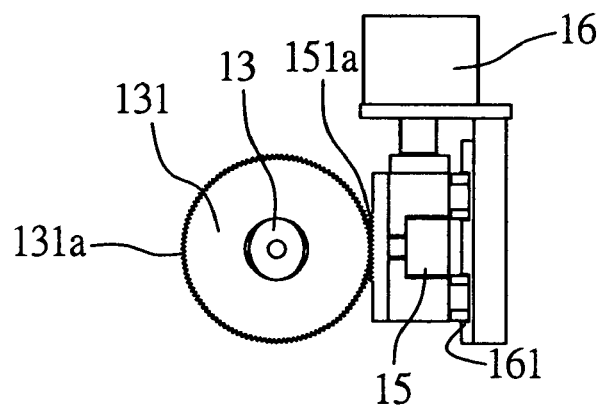
FIG. 5 is a schematic view illustrating the clamping device of the injection-molding machine during clamping according to one preferred embodiment of the present invention.

Referring to both FIG. 4 and FIG. 5, the second clamping unit 16 is fixed on a vertical side of the first clamping unit 15 to actuates the first clamping unit 15 and the third engaging part 151a to slide up and down on the sliding member 161. The second clamping unit 16 may be driven by a clamping pressure cylinder, a unit capable of moving in a reciprocating motion, and other equivalent structures. As a result, the gear wheel member 131 may be actuated to move up and down following initiation of the second clamping unit 16, so that the gear wheel member 131 having the second engaging part 131a generates a rotational torque and drives the screw rod unit 13 to generate a clamping thrust.

Although the first clamping unit 15 and the engaging member 151 are driven by the second clamping unit 16 to move up and down in the present embodiment, it should be noted that the corresponding locations for the first clamping unit 15 and the second clamping unit 16 are not limited as such. In other words, the first clamping unit 15 and the second clamping unit 16 may also be located to left and right sides interchangeably, such that the second clamping unit 16, in addition to being driven vertically, horizontally drives movements of the first clamping unit 15 and the third engaging part 151a.

Figure 3:
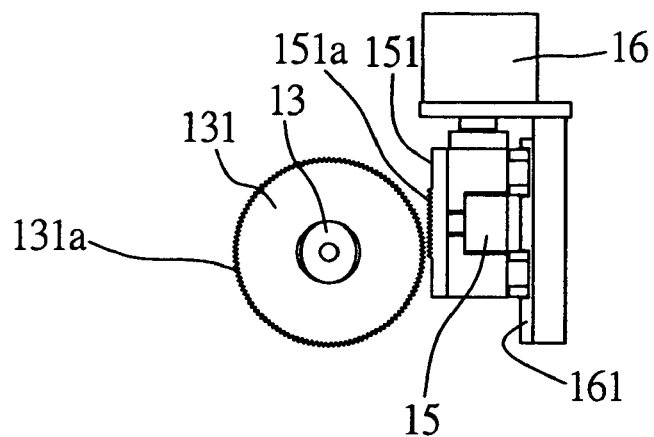
FIG. 3 is a schematic diagram illustrating the clamping device for the injection-molding machine before the mold is closed according to one preferred embodiment of the present invention.

As shown in FIG. 2 and FIG. 3, at the initial stage of closing the mold, the driving source 17 actuates the transmission unit 14 to transmit a driving force to the screw rod unit 13. With the driving force of the driving source 17, the screw rod unit 13 moves the movable mold holder 11 towards a fixed mold holder mounted with a second mold 23. Preferably, the screw rod unit 13 may be a large lead screw rod as the large lead screw rod with a larger pitch increases the progression speed, so as to quickly bring the first mold 21 close to the second mold 23 that corresponds to the first mold 21. However, the screw rod unit 13 is not limited to a large lead screw rod.

Since feeding of a plastic material from a feeding barrel to an injecting unit of the injection-molding machine and then to the mold is a known art, it is not discussed and illustrated in details herein. The following is a detailed description of the manner in which the clamping device of the present invention is actuated to close and open the molds.

Referring again to both FIG. 4 and FIG. 5, as the screw rod unit 13 keeps progressing at a high speed to reach the mold closing state where the first mold 21 contacts to the second mold 23, the first clamping unit 15 is driven by a driving source (not shown). As a result, the third engaging part 151a of the engaging member 151 is driven to engage to the second engaging part 131a of the gear wheel member 131, and the second clamping unit 16 actuates the engaging member 151 to move up and down. Since the third engaging part 151a engages to the second engaging part 131a to hold up the screw rod unit 13, and the engaging member 151 is actuated by the second clamping unit 16 to move up and down for generating a rotational thrust, the gear wheel member 131 having the gear teeth structure generates a large torque and forces the screw rod unit 13 to generate a large thrust.

Figure 6:
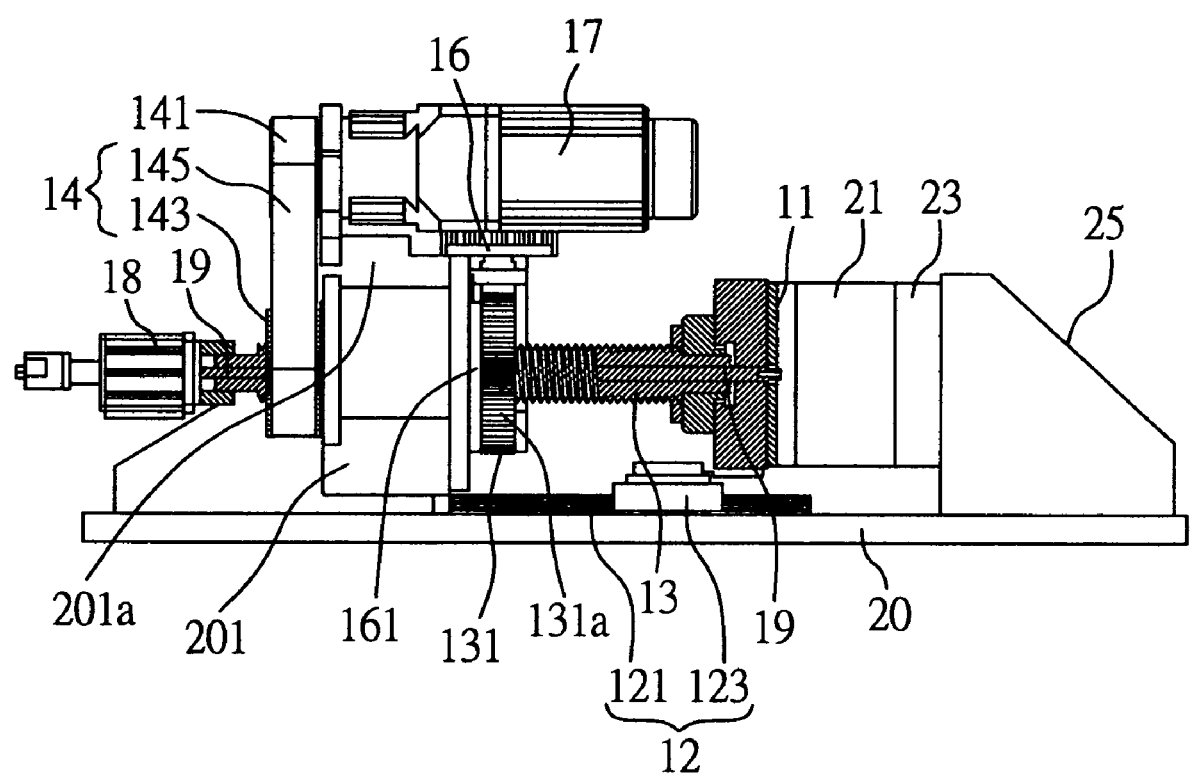
FIG. 6 is a side view of the clamping device of the injection-molding machine after the mold is closed according to one preferred embodiment of the present invention.

Referring to FIG. 6, when the clamping device of the injection-molding machine is closed, the material can be sent via an injection unit (not shown) to the first mold 21 and the second mold 23. As the material is cooled down and solidified in the molds, the first clamping unit 15 drives the third engaging part 151 a to disengage from the second engaging part 131a of the gear wheel member 131 and the clamping force is released.

And as the mold is opened, the engagement between the third engaging part 151a and the second engaging part 131a is relieved. The driving device 17 provides a reversed power that acts in opposite to the clamping action, so that the reversed power is transmitted via the transmission unit 14 to the gear wheel member 131. Upon receiving the reversed power, the gear wheel member 131 drives the screw rod unit to move in a linear motion. In other words, the driving source 17 is reversed to actuate the screw rod unit 13, so that the screw rod unit 13 drives the movable mold holder 11 and the first mold 21 to move backwards to a mold opening position. And a member 18, such as a projecting air pressure cylinder capable of moving in a reciprocating motions is actuated to transmit power to the projection unit 19, SO that the injection product (not shown) is ejected out.

Summarizing from the above, the clamping device for injection molding machine allows an increase in input torque for the rotational movement of the screw rod unit 13, so that the screw rod unit 13 can generate an enlarged linear thrust (clamping force). In other words, with the engagement generated by the first clamping unit 15 and the rotational thrust generated by the second clamping unit, the input torque is increased. The clamping force generated as a result of converting the increased input torque into the high pressure linear thrust is not limited by the driving source 17. The first clamping unit 15 and the second clamping unit 16 may be actuated to generate a higher clamping force without an upper limit. Therefore, the clamping force limit associated with the prior art is removed and a complex clamping device with the clamping force generated from other driving sources is provided.

Since the third engaging part engages to the second engaging part for generating a rotational torque, the gear wheel unit drives the screw rod unit to perform high pressure clamping for closing the mold. Therefore, the clamping device for the injection molding machine not only ensures a tight connection between the first mold 21 and the second mold 23, but the resulting clamping force also depends on the thrust generated by the first clamping unit 15 and the second clamping unit 16. As a result, the clamping force generated as such barely has an upper limit. This prevents energy wasted from using a large and inappropriate driving source as in the prior art, further modularizing the clamping device and reducing fabrication cost and maintenance cost.

Meanwhile, since the clamping device for injection molding machine provides a better and broader clamping force, the clamping device for injection molding machine can hold up a larger injection pressure and a larger product dimension than the conventional art. So, for the injection product, the clamping device for injection molding machine improves durability of the electrical direct pressure injection-molding machine.

According to the clamping device for injection molding machine, the clamping force without the upper limit can be generated by combining different low power driving sources with a larger torque when the mold is closed. This improves from the drawbacks, such as flashing, the molded product with flashes, and other problems that adversely affect product mass due to insufficient clamping force, while the processing cost and energy are saved.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A clamping device for injection molding machine, comprising:
    a movable mold holder having a first side coupled to a mold;
    a guiding unit disposed on a platform of the injection molding machine for guiding the movable mold holder mounted thereon to move in linear motion;
    a gear wheel member having a first engaging part at a center thereof, and a second engaging part at a periphery thereof;
    a screw rod unit having one end coupled to a second side of the movable mold holder, the screw rod unit penetrating and engaging the first engaging part of the gear wheel member in such a way that a rotation of the gear wheel member drives the screw rod unit to move in linear motion;
    a transmission unit for transmitting power of a driving source to the screw rod unit via the gear wheel member;
    an engaging unit having a third engaging part;
    a first clamping unit disposed on one side of the screw rod unit away from the movable mold holder and coupled to the engaging unit, so that the first clamping unit drives the third engaging part to engage to/disengage from the second engaging part of the gear wheel member; and
    a second clamping unit coupled to the first clamping unit for driving the third engaging part, such that the third engaging part engages to the second engaging part to generate a rotational torque for driving the gear wheel member and actuating the screw rod unit to engage in a pressure clamping movement for clamping; the engagement between the third engaging part and the second engaging part is relieved, and the driving source is reversed to actuate the screw rod unit such that the screw rod unit drives the movable mold holder and the mold for opening the mold.

2. The clamping device for injection molding machine as claimed in claim 1, wherein the guiding unit further comprises a sliding track and a sliding seat.

3. The clamping device for injection molding machine as claimed in claim 1, wherein the screw rod unit is a lead screw rod.

4. The clamping device for injection molding machine as claimed in claim 1, wherein the screw rod unit shares the same axis of rotation as the gear wheel member.

5. The clamping device for injection molding machine as claimed in claim 1, wherein the screw rod unit is a hollow tube structure; further comprising a projection unit disposed in the hollow tube structure, said projection unit being movable to project into the mold so as to eject an injection product from the mold.

6. The clamping device for injection molding machine as claimed in claim 5, wherein the projection unit is actuated by a unit coupled to an end of the screw rod unit and adapted to move said projection unit in a reciprocating motion.

7. The clamping device for injection molding machine as claimed in claim 5, wherein the projection unit is a rod member.

8. The clamping device for injection molding machine as claimed in claim 1, wherein the first engaging part includes structures for engaging to threads of the screw rod unit.

9. The clamping device for injection molding machine as claimed in claim 1, wherein the gear wheel member is selected from a group consisting of a gear wheel, a friction wheel, and a pulley.

10. The clamping device for injection molding machine as claimed in claim 1, wherein the transmission unit further comprises an active wheel, a passive wheel, and a transmission piece.

11. The clamping device for injection molding machine as claimed in claim 10, wherein the transmission piece is selected from a group consisting of a timing belt, a chain, and a gear.

12. The clamping device for injection molding machine as claimed in claim 1, wherein the driving source is a motor.

13. The clamping device for injection molding machine as claimed in claim 1, wherein the driving source is coupled to top of a bearing seat of the platform so as to drive the screw rod unit moving in reciprocating motion.

14. The clamping device for injection molding machine as claimed in claim 1, wherein the first clamping unit is driven by a unit capable of moving in reciprocating motion.

15. The clamping device for injection molding machine as claimed in claim 1, wherein the engaging unit is fixed on the first clamping unit, such that when an air pressure cylinder drives the first clamping unit, the engaging unit is reciprocated to engage the second engaging part of the gear wheel member.

16. The clamping device for injection molding machine as claimed in claim 1, wherein the engaging unit comprises at least one of a gear rack, a friction board, and a flat line belt.

17. The clamping device for injection molding machine as claimed in claim 1, wherein the first clamping unit and the engaging unit are coupled freely to a sliding member.

18. The clamping device for injection molding machine as claimed in claim 17, wherein the sliding member is selected from a group consisting of a sliding track, a linear bearing, and units capable of moving in linear motion.

19. The clamping device for injection molding machine as claimed in claim 17, wherein the second clamping unit is fixed on a vertical side of the first clamping unit in such a way that the first clamping unit and the engaging unit are driven to slide up and down on the sliding member.

20. The clamping device for injection molding machine as claimed in claim 1, wherein the second clamping unit is a unit capable of moving in reciprocating motion.

* * * * *